(12) United States Patent  (10) Patent No.: US 6,480,977 B1
Apisdorf et al.  (45) Date of Patent: Nov. 12, 2002

(54) MULTI-PROTOCOL MONITOR

(75) Inventors: Joel Apisdorf; Keith Burden, both of Reston, VA (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/430,094

(22) Filed: Oct. 29, 1999

(51) Int. Cl.$^7$ ................................................ H04J 3/14
(52) U.S. Cl. ...................... 714/712; 370/241
(58) Field of Search ....................... 714/712; 370/248, 370/250, 241

(56) References Cited

U.S. PATENT DOCUMENTS

| | | | |
|---|---|---|---|
| 4,979,174 A | | 12/1990 | Cheng et al. ................. 371/41 |
| 5,345,451 A | | 9/1994 | Uriu et al. ..................... 371/42 |
| 5,812,529 A | * | 9/1998 | Czarnik et al. ............. 370/245 |
| 5,844,923 A | | 12/1998 | Condon ..................... 371/47.1 |
| 5,850,388 A | * | 12/1998 | Anderson et al. ........... 370/252 |
| 5,878,057 A | | 3/1999 | Maa .......................... 371/37.6 |
| 5,917,828 A | | 6/1999 | Thompson .................. 370/474 |
| 6,115,393 A | * | 9/2000 | Engel et al. ................ 370/469 |

OTHER PUBLICATIONS

RADCOM Application Note AN–49/94, "How to Test SONET/SDH Lines Using the RC–200–C", pp. 1–9, Dec. 1995.*

RADCOM Application Note AN–9/95, "How to Test Interim Local Management Interface Using the RC–200–C", pp. 1–12, Dec. 1995.*

RADCOM Application Note AN–52/94, "How to Analyze LAN Traffic Over ATM Using the RC–200–C", pp. 1–6, Dec. 1995.*

Morrisey, P., "Four ATM Analyzers to Troubleshoot Your Network", Network Computing, pp. 1–6, Aug. 1996.*

Wandel & Goltermann Application Note, "Using a Web browser to connect to the DominoServer", pp. 1–3, Nov. 1998.*

Wandel & Goltermann, Advanced NetworkTesting Magazine, Issue 3, pp. 1–7, Dec. 1998.*

RADCOM Product Note, "WireSpeed 622 ATM Protocol Analyzer", pp. 1–4. Dec. 1998.*

Wandel & Goltermann Application Note, "Qecc Protocol Analysis of OC–N/STM–N networks", pp. 1–2, Mar. 1999.*

Wandel & Goltermann Application Note, Protocol Analysis of user data encapsulated within OC–N/STM–N networks, pp. 1–3, Mar. 1999.

Wandel & Goltermann White Paper, "What is a Protocol Analyzer", pp. 1–10, Mar. 1999.

Hewlett Packard News Release, "HP Introduces First Solutions for Packet over SONET/SDH Testing from 155Mb/s to 2.4 Gb/s", pp. 1–2, May 1999.

* cited by examiner

Primary Examiner—Stephen M. Baker

(57) ABSTRACT

A method is taught for monitoring information traffic through a traffic link transmitting first and second differing information signals each having a plurality of information layers and first and second pluralities of information packets in a monitoring system having monitoring circuitry and including processor circuitry and a server operating cooperatively with the monitor circuitry. The method includes segmenting the information packets of the first and second pluralities of information packets into information cells to provide corresponding first and second pluralities of information cells and interspersing the information cells of the first and second pluralities of information cells with each other to provide interspersed first and second information cells. Intercepting a portion of the interspersed first and second information cells to provide intercepted interspersed information cells using an interceptor coupled to the traffic link and stripping an information layer from the intercepted interspersed information cells by the monitoring circuitry to provide a remaining information signal including portions of the intercepted interspersed information cells are also set forth. The intercepted interspersed information packets of at least one of the first and second pluralities of information packets within the remaining information signal are reassembled to provide a plurality of reassembled information packets by the processor circuitry. An analysis is performed on the plurality of reassembled information packets by the server.

31 Claims, 4 Drawing Sheets

MULTI-PROTOCOL MONITOR

FIELD OF THE INVENTION

This invention relates to monitoring of optical links and, in particular, to monitoring the traffic of an optical communications network by monitoring an optical link of the communications network.

BACKGROUND OF THE INVENTION

It is known in the prior art to passively monitor the various protocols of information traffic flow at both ends of an information carrying link within a communications system such as a synchronized optical communications network (SONET). The prior art techniques for monitoring packets formed of information containing cells include capturing the packets from an optical link as the packets were being transmitted from one point in the network to another through the link. These prior art link monitoring devices are capable of capturing packets transmitted on a link until the available memory were full.

Usually when a packet is captured, it is time stamped. An exception is a transmission method wherein the cells of the packet are segmented at one end of the optical link prior to transmission and reassembled at the other end. Here each cell of the data packet is time stamped by the link monitoring device and a linked list of the order of the captured cells is maintained in order to permit the reassembly operation.

Link monitoring devices could include optical cards for performing such operations as the actual capture of information packets and the various conversions required for a host computer to perform analysis upon the captured packets. The analysis by the link monitoring devices included procedures such as statistical analysis. Within link monitoring devices of this type the host would supply memory blocks to the optical cards for containing intercepted information.

Another kind of analysis performed by the host computer on packets received from the optical card was quality analysis. When quality analysis was performed, a stream of traffic through an optical link was monitored at multiple locations throughout the network and the results were compared. Packet corruption and packet loss could be determined using the comparison. Usually the comparison required communication between different link monitoring devices. Quality analysis could be performed in parallel with the normal flow of information through the monitored optical link. Furthermore, it could be performed without having any impact on the normal information flow.

Baseline traffic flows through different parts of the optical network were also determined using the known link monitoring devices. Current traffic flows were then compared to the determined baselines in order to ascertain the current state of the network. The routing of the network traffic flow could then be adjusted according to the current state of the network. Additionally, archives of traffic flow data were developed and the archives were used to determine network behavior and to determine and predict traffic flow trends within the network. Traffic path data and frequency of routing path changes, or network connectivity, was also studied.

SUMMARY OF THE INVENTION

A method is taught for monitoring information traffic through a traffic link transmitting first and second differing information signals each having a plurality of information layers and first and second pluralities of information packets. The method is practiced in a monitoring system having monitoring circuitry and including processor circuitry and a server operating cooperatively with the monitoring circuitry. The method includes segmenting the information packets of the first and second pluralities of information packets into information cells to provide corresponding first and second pluralities of information cells and interspersing the information cells of the first and second pluralities of information cells with each other to provide interspersed first and second information cells. The method further includes intercepting a portion of the interspersed first and second information cells to provide intercepted interspersed information cells using an interceptor coupled to the traffic link and stripping an information layer from the intercepted interspersed information cells by the monitoring circuitry to provide a remaining information signal including portions of the intercepted interspersed information cells. The intercepted interspersed information packets of at least one of the first and second pluralities of information packets within the remaining information signal are reassembled to provide a plurality of reassembled information packets by the processor circuitry. An analysis is performed on the plurality of reassembled information packets by the server.

DETAILED DESCRIPTION OF THE INVENTION

Figure 1:
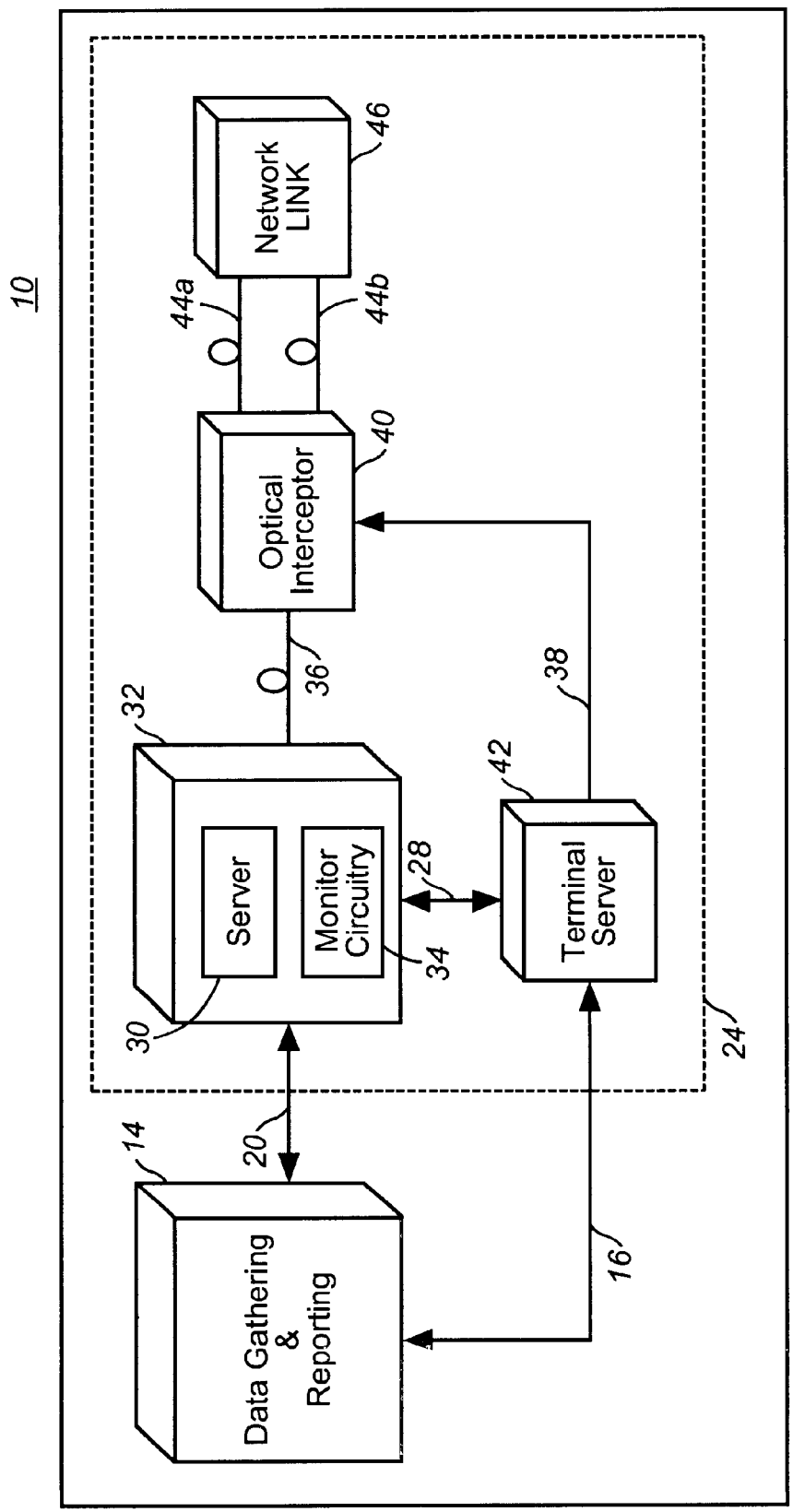
FIG. 1 shows a deployment diagram of the multi protocol optical link monitoring system of the present invention.

Referring now to FIG. 1, there is shown a deployment diagram of a multi-protocol monitoring system 10 of the present invention. Multi protocol monitoring system 10 includes an information carrying network optical link 46, which is an optical link of a conventional optical network. The well known Synchronous Optical Network (SONET) network link is but one example of a type of synchronized optical link to which the present invention can be advantageously applied, as the present invention can be practiced with optical links of any optical data network.

Multi protocol monitoring system 10 also includes monitor processor system 32 and optical interceptor 40. Within multi protocol monitor system 10 optical interceptor 40 can intercept a portion of the information traffic that is carried in a selected optical link, such as network link 46. Optical interceptor 40 automates the task of fiber/channel selection and intercepts the traffic information of selected network link 46 by way of duplex optical links 44a,b.

While optical interceptor 40 intercepts all data packets of energy transmitted through network optical link 46, the present invention system selects only portions of the overall link traffic for processing. The data traffic from network optical link 46 that is intercepted by optical interceptor 40 is applied by way of duplex optical link 36 to monitor processor system 32. The intercepted light energy applied by way of duplex optical link 36 in this manner can be ten to fifty percent of the total light energy of network optical link 46.

Monitor processor system 32 gathers and analyzes the intercepted traffic data from optical interceptor 40.

Additionally, system 32 provides reports on the results of the monitoring of network optical link 46 as performed by multi protocol monitoring system 10. The reports on the monitoring operations of system 10 can be applied by way of communication line 20 to data gathering and reporting block 14 for communication to systems external to system 10.

The results of the monitoring of network optical link 46 provide many useful functions. One of the useful functions that can be provided is a network security function. In order to perform the network security function, monitor processor system 32 can be programmed in a conventional way to detect intrusions into the network of optical link 46 based upon the intercepted information applied to it. Another important function that can be performed as a result of the monitoring performed by monitoring system 10 is determining which packets of the intercepted link were lost or altered during transmission.

A very important function that can also be performed using the results of the monitoring by multi protocol monitoring system 10 is traffic engineering. Monitor processor system 32 can determine, for example, how much traffic is transmitted through the link from which the information applied to monitor processor system 32 is intercepted. Furthermore, when making determinations of this nature, the analysis and data storage performed by monitor processor system 32 can be used to determined whether there are any other methods of traffic handling that may be more effective than the methods currently being used. This information can be used to improve network management and network operations.

Figure 2:
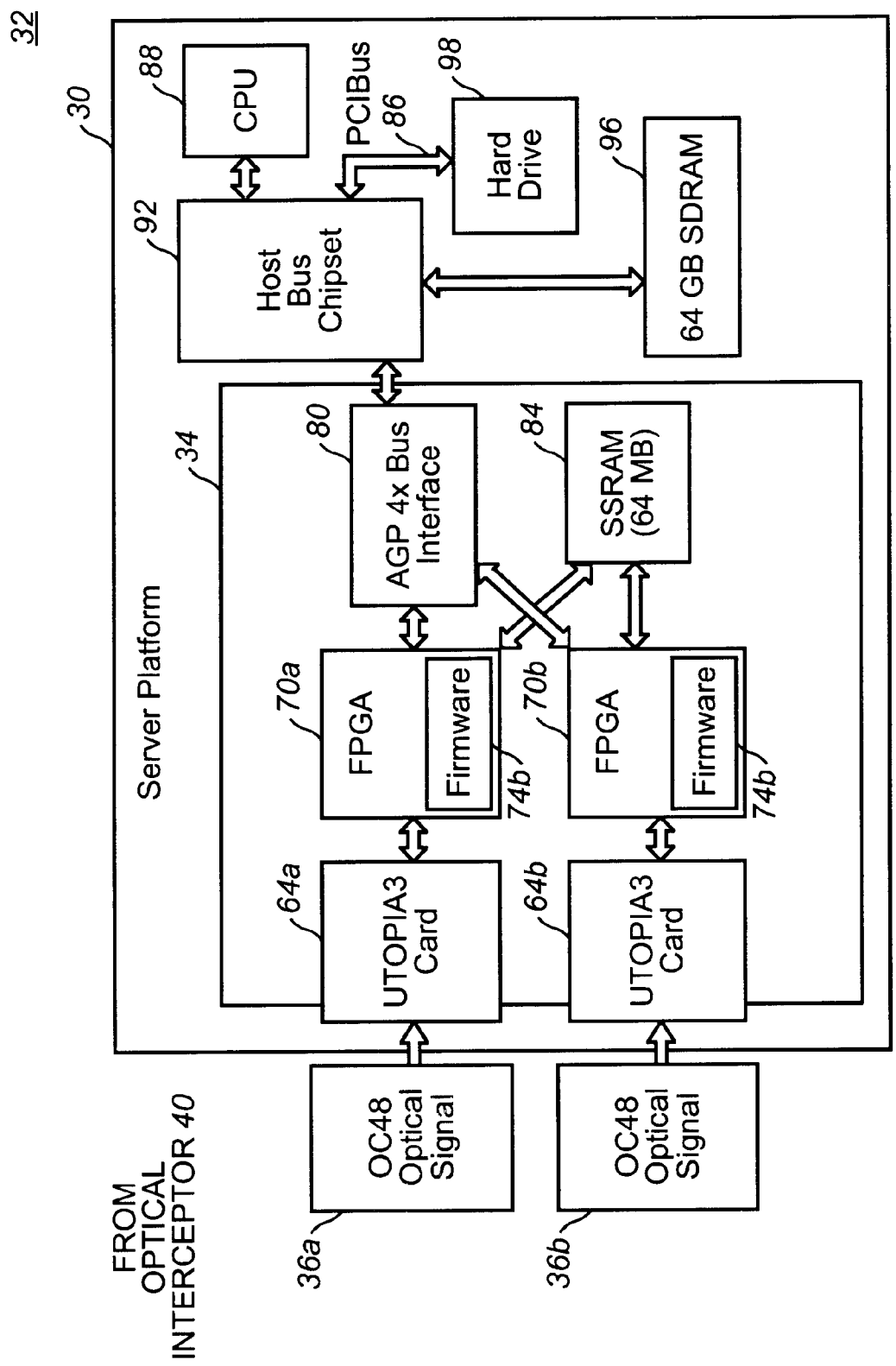
FIG. 2 shows a block diagram representation of a traffic monitoring system suitable for use within the multi protocol optical link monitoring system of FIG. 1.

Referring now to FIG. 2, there is shown a more detailed representation of monitor processor system 32 within multi protocol monitoring system 10. Monitor processor system 32 includes server platform 30 and traffic monitoring circuitry 34. Server platform 30 can be a conventional desktop computer provided with central processing unit 88, memory 96, and disc drive 98 in a convention manner. Bus chipset 92 and hard drive 98 are also provided within server platform 30. Conventional bus 86 is provided for coupling hard drive 98 to bus chipset 92 within server platform 30.

The optical signals received from optical interceptor 40 by way of optical links 36a,b are applied to optical-to-electrical converters 64a,b of traffic monitoring circuitry 34. Optical-to-electrical converters 64a,b perform the optical-to-electrical conversion of both the receive and transmit signals of monitor processor system 32. Additionally, framers within cards 64a, b can handle the conventional overhead traffic of optical network link 46 as well as the decapsulation and encapsulation of the payloads of network link 46. Circuitry performing these functions can be obtained in commercially available subsystems such as the UTOPIA-3 subsystem.

Cards 64a,b are coupled to field programmable gate arrays 70a, b. Field programmable gate arrays 70a,b are of a well known type of gate array and includes a large number of configurable logic blocks. The configurable logic blocks of field programmable gate arrays 70a,b can be configured and connected to provide circuitry that performs functions of such as for example counters, multiplexers, FIFOs and byte scramblers, etc. Files that configure and reconfigure gate arrays 70a,b can be repeatedly downloaded to traffic monitoring circuitry 34 under the control of server platform 30. The ability to repeatedly reconfigure gate arrays 70a,b permits traffic monitoring circuitry 34 to perform many different applications.

Coupled to gate arrays 70a,b is synchronous static RAM 84 (SSRAM). Among the functions of SSRAM 84 are storing information packets and cells intercepted by optical link 40 and applied to traffic monitoring circuitry 34. Additionally, SSRAM 84 can store a reassembly state during the reassembly of a data packet by traffic monitoring circuitry 34. Accelerated graphics port interface 80, also within traffic monitoring circuitry 34, is a point-to-point bus that provides a very fast interface between traffic monitoring circuitry 34 and server platform 30. Accelerated graphics port interface 80 includes a conventional PCI bus as its base architecture and increases interface throughput by clocking the PCI architecture at higher speeds. It also provides additional address lines in order to pipeline bus transactions.

A well known transmission mode suitable for transmissions through networks such as network link 46 is the asynchronous transfer mode (ATM). Users can have packets ranging from 28 to 65,522 bytes. However, in a commonly used ATM method the cells are fifty-three bytes long with only forty-eight bytes being available for the user data. Since the user information is thus too long for transmission as a whole packet, the user information is broken down to fit into the ATM cells prior to transmission. An advantage of this mode is that a transmission link carrying the ATM information can be completely filled with cells. When transmitting using ATM, each cell is provided with a header and routed through the network according to its header.

This permits the packet to be determined and treated as a whole for analysis within multi protocol monitoring system 10. This process can be performed by field programmable gate array FPGA's 70a,b within traffic monitoring circuitry 34. Other operations related to ATM cell processing that can be performed by FPGA's 70a,b include, but are not limited to, selection and time stamping of information cells.

Another well-known transmission mode suitable for transmission through networks such as network link 46 is Packet Over SONET (POS) mode wherein the bytes of a packet are all sent on the link together. Thus there is no need for more than one reassembly state to be maintained by monitor processor system 32. This frees up the on-card memory for other uses.

POS does not include a length field as part of the point to point protocol (PPP) header. Thus, it may be useful to provide such a length field at the beginning of the packet. Doing so makes it possible for host 30 to skip to the next packet in a packed, variable length, buffering scheme. When putting the length at the beginning, it may be necessary for circuitry 34 to buffer up 2 packets in its own memory before copying them to server 32. SSRAM 84 could be used for this.

Monitoring circuitry 34 can receive the intercepted interspersed information and strip the SONET layer of information from it. CPU 88 within server platform 30 can reassemble the information by selecting the interspersed packets corresponding to a selected information signal from their various locations within the intercepted signal according to the information in the headers. Analysis can be performed on the reassembled information signal by host 30.

Referring again to the ATM Mode, monitoring circuitry 34 can be provided with a pointer to an area of host memory which can hold many cells at a time, called a block. Monitoring circuitry 34 can have about 2 such pointers. Having 2 pointers allows monitoring circuit 34 to have a place to put additional data after a block is filled and before host 30 has a chance to give circuitry 34 another pointer in host memory. Making these blocks larger allows for more host CPU interrupt latency.

In the POS mode, as in the ATM mode, circuitry 34 can have 2 pointers to blocks of many packets at a time, and each pointer can have a length measured in 64-bit or 128-bit words. When using the system to capture whole packets the system captures all the bytes of every packet on the link until it runs out of storage. When performing partial tracing only certain cells or bytes on a link are captured. These include in ATM mode some combination of first, second, third, other non-last, and last cells. For POS mode, partial tracing would mean indicating how many bytes at the beginning of the packet should be captured, and how many at the end.

Traffic generation within the system of the present invention can be simple and short or it can be long and complex. Complex traces can require that all the bytes going out of host 30 be completely specified, as would be the case for playback of long trace. Simple traces could be the contents of a single VC. In the ATM mode monitoring circuitry 34 is responsible for filling in the HEC field of the ATM header and scrambling the ATM payload. Monitoring circuitry 34 also sends idle cells when it is starved for cell blocks from host 30.

Host 30 provides the monitoring circuitry 34 with a single stream of cells with all packets already segmented into cells using any AAL interleaved with other virtual path/virtual channel (VP/VC) cells exactly as the host expects the cells to appear on link 46. Host 30 does not provide time stamps. Since ATM links are always completely filled with cells, host 30 should insert idle cells where it expects the link to be transmitting no meaningful user data. Repeat counts can be provided by the host per cell to allow large numbers of idle cells to be specified.

When a sequence of cells is to be sent multiple times by monitoring circuitry 34, host 30 can ensure that the block containing them is at least as large as the blocks used during receive for reasons of host latency. But host 30 is free to give the same block to monitoring circuitry 34 as many times as it likes since monitoring circuitry 34 does not alter the block during reading. Host-based offline preprocessing tools can be written to convert a trace file of packet header cells, or all cells, including timestamps, into a suitable format.

In POS mode monitoring circuitry 34 is responsible for stuffing occurrences of the reserved flag byte (0×7E) in data provided by host 30 with its 2-byte replacement (0×7D 0×5E). Monitoring circuitry 34 is also responsible for transmitting flag bytes when it is starved for packet blocks from host 30. Unlike ATM mode, all bytes of each packet are stored contiguously in host memory, so there are no issues of shuffling the pieces of one packet together with pieces of another. Host 30 provides all bytes of the packet, including PPP headers, trailers and the cyclical redundancy checks, CRC16/CRC32, as appropriate. This allows host 30 to falsify errors in any of those fields as well as higher-layer fields such as internet protocol (IP) and Transmission Control Protocols (TCP's) checksums. Since packets are variable length, and since packets are stored in host memory immediately after each other, each packet is preceded by a 4-byte length field to allow monitoring circuitry 34 to know when to begin and end framing.

Host 30 does not hand off a timestamp to the card per-packet. In order to delay the start of the next packet by more than the mandatory single flag bytes, host 30 appends a 32-bit field to the end of each packet which tells the card how many flag bytes to append. A zero in this field means append one flag and a one means append 2 flags, and so on. Host-based offline preprocessing tools will be written to convert a trace file of packet headers, or whole packets, including timestamps, into the format described above as suitable for consumption by the card.

Application software on host 30 can be responsible for processing the blocks of packets received by monitoring circuitry 34 once it notifies host 30 that a block is full. The application can choose to hold onto the blocks until memory is full and then save the blocks to disk. But the application can also choose to read portions of the packets from host memory right away and calculate various statistics with them. Afterwards, the packets themselves can probably be discarded. This is the mode in which an ISP can run monitoring circuitry 34 to obtain statistics for traffic flowing down its links, which the routers are currently incapable of gathering.

All applications written to communicate with the monitoring circuitry 34 device driver can be able to operate as well from traces stored on disk or coming from a link in real-time, because the device driver allows another application to write to its pool of buffer blocks. The only limitation is that the application processing the packets must do so at the same sustained rate as the link itself, otherwise the host memory blocks used to cover the burst rate eventually becomes exhausted and the card drops packets.

Tables I, II and III set forth real-time packet rates on a PPP link. The rates are sustained packet rates, assuming various packet size distribution for fully and partially filled links.

TABLE I

FULL

| Packet Distribution | IP packet size | PPP header + trailer | PPP packet size | Weighted PPP packet size | PPP packet/sec/ direction |
|---|---|---|---|---|---|
| 100% | 40 bytes | 8 bytes | 48 bytes | 48 bytes | 6,250,000 |

TABLE II

FULL (FROM EMPIRICAL PRODUCTION DATA)

| packet distribution | IP packet size | PPP header + trailer | PPP packet size | weighted PPP packet size | PPP packets/sec/ direction |
|---|---|---|---|---|---|
| 5% | 1040 | 8 | 1048 | 52.4 | 40,096 |
| 10% | 1500 | 8 | 1508 | 150.8 | 80,192 |
| 15% | 564 | 8 | 574 | 86.1 | 120,289 |
| 20% | 296 | 8 | 304 | 60.8 | 160,385 |
| 50% | 40 | 8 | 48 | 24 | 400,962 |
| 100% | | | | 374.1 | 801,925 |

TABLE III

HALF-FULL (FROM EMPIRICAL PRODUCTION DATA)

| packet distribution | IP packet size | PPP header + trailer | PPP packet size | weighted PPP packet size | PPP packets/sec/ direction |
|---|---|---|---|---|---|
| 50% | | | | 187 | 400,962 |

Any system performing real-time flow monitoring must be able to process packets at the above rates. Depending upon the statistics the user wishes to gather it may be valid to discard M out of N packets (i.e., decimate the data).

Tables IV and V set forth real-time packet rates on an ATM Link assuming that the same distribution of packet sizes persists, we proving the following tables for TCP/IP over ATM.

TABLE IV

FULL

| Packet Distribution | IP packet size | LLC/ SNAP header | AAL5 trailer | # of cells | ATM header over head | last cell padding | AAL5 PDU length | weighted AAL5 PDU length | AAL5 packets/sec/ direction |
|---|---|---|---|---|---|---|---|---|---|
| 100% | 40 | 8 | 8 | 2 | 10 | 40 | 106 | 108 | 2,830,189 |

TABLE V

FULL (FROM EMPIRICAL PRODUCTION DATA)

| Packet Distribution | IP packet size | LLC/ SNAP header | AAL5 trailer | # of cells | ATM header over head | last cell padding | AAL5 PDU length | weighted AAL5 PDU length | AAL5 packets/sec/ direction |
|---|---|---|---|---|---|---|---|---|---|
| 5% | 1040 | 8 | 8 | 22 | 110 | 0 | 1188 | 58.3 | 32,719 |
| 10% | 1500 | 8 | 8 | 32 | 180 | 20 | 1696 | 169.6 | 65,438 |
| 15% | 564 | 8 | 8 | 13 | 65 | 44 | 689 | 103.35 | 98,157 |
| 20% | 296 | 8 | 8 | 7 | 35 | 24 | 371 | 74.2 | 130,876 |
| 50% | 40 | 8 | 8 | 2 | 10 | 40 | 106 | 53 | 327,189 |
| 100% | | | | | | | | 458.45 | 654,379 |

Thus, streams of traffic for a single flow as seen at multiple sites can be compared. If the timestamps can be synchronized at monitoring circuitry 34 of the various systems 10, then latency through network can be calculated. Comparing packet contents shows corruption. Comparing packet CRC's or checksums shows loss and reordering. Generally quality of service measurements require that circuitry 34 communicate with a coordinating server, which identifies flows of interest and does correlation. The quality of service can probably be performed in parallel with and without impacting, real-time flow monitoring.

If more than one system 10 is deployed within a network, as would be the case in production systems, the same personnel may have to communicate with many geographically separate monitors. This necessitates a multi machine deployment model. Client/Server is used as a configuration to meet this requirement.

Traffic generation and trace capture at network speeds require the use of an accelerated graphics port (AGP) bus, which is the bus that best meets the bandwidth requirements for the previously specified server architecture and speeds during the recording and playback of long full traces.

When doing full traces there may be no disk that will be able to keep up, because for a Personal Computer (PC) bus. Therefore, system 10 is not required to support continuous full tracing to or from disk.

In general the reassembly performed on such information cells can be either a partial reassembly or a full reassembly. In a partial reassembly the card remembers only the count of the number of cells it has seen. It does not change the order of interspersed information. In a full reassembly the computer must remember where the previous cell was placed in host memory in order to determine where to put the next. In both partial reassembly and full reassembly the ATM headers of the cells are applied to server platform 30 along with the information cells. In a preferred embodiment of the invention, a full reassembly of the information cells intercepted from network link 46 is performed within multi protocol monitoring system 10. In order to perform the reassembly, a linked list of the stored cells of the information packet is determined after the cells are copied into memory 96.

The determination of the linked list of the stored cells is performed by traffic monitoring circuitry 34. Application software provided within application firmware 74*a,b* of FPGA's 70*a,b* is used to make the list determination. When application firmware 74*a,b* determines the linked list it must also strip the ATM headers from the information cells before it can treat the information as packets rather than as cells.

Prior to applying the information cells to memory 96 of server platform 30, FPGA's 70*a,b* of traffic monitoring circuitry 34 must strip a network link layer of information from the intercepted signal received from optical to electrical converters 64*a, b*. The network link layer can include information such as the accepted standards for transmitting signals on network link 46, how the ones and zeros of a transmission within network link 46 are represented, the description of the various layers of information transmitted therein, and the percentage of the capacity of optical network link 46 that is used for overhead information.

Traffic monitor circuitry 34 is shown coupled to server platform 30 in a representation of a preferred embodiment provided for illustrative purposes only. Those skilled the art will understand that traffic monitoring circuitry 34 can be coupled to other devices when practicing the present invention. For example, traffic monitoring circuitry 34 can be coupled to a router located within network link 46. However, it is believed that the use of a computer such as the computer provided within monitor processor system 32 acting in cooperation with traffic monitoring circuitry 34 provides improved results.

AGP bus 80 is a point to point bus for Intel based computers. The purpose of AGP is to provide a very fast interface between a graphics device and host memory. AGP uses PCI as its base architecture and increases throughput by faster clocking and additional address lines to pipeline bus transactions. As the name implies, it accelerates graphics by facilitating the rapid transfer of blocks of memory such as texture maps and lists of vertices to a graphics card. Use of AGP for data acquisition does not mean that host 30 cannot have a display. Slower PCI graphic cards can still be used to provide server console display functions. AGP is the fastest interface available for the PC. Table VI shows several values of interface speeds wherein values in parenthesis refer to speed after SONET overhead is removed.

TABLE VI

INTERFACE SPEEDS

| Bus Type | Speed Mbits | Multi-Vendor |
|---|---|---|
| PCI 32 bit 33 MHz | 1,056 | Y |
| PCI 32 bit 66 MHz | 2,112 | N |
| PCI 64 Bit 33 MHz | 2,112 | N |
| PCI 64 Bit 66 MHz | 4,224 | N |
| AGP 66 MHz (1x) 32 Bit | 2,112 | Y |
| AGP 132 MHz (2x) 32 Bit | 4,224 | Y |
| AGP 264 MHz (4x) 32 Bit | 8,448 | Y |
| OC48* | 2,488 (2,400) | Y |
| OC192* | 9,953 (9,600?) | Y |

SSRAM 84 is faster than asynchronous RAM and is static in order to obviate the need for refresh circuitry thereby reducing the amount of on board circuitry. It can be used to store packets and cells and to hold ATM reassembly states. In addition to SSRAM 84 in FIGS. 2 and 3, content addressable memory can be provided and coupled to the PCI bus interface.

FPGA 70a,b is a chip that contains a multitude of configurable logic blocks. These blocks can be connected and configured to perform functions such as counters, multiplexers, FIFOs, and byte scramblers. Downloading a binary file that configures the device CLBs and interconnections can be done multiple times under control of host 30. This allows the alteration of the firmware to meet a specific application's needs, at any time. FPGA 70a,b is used in this design to perform the interfacing between the UTOPIA-3 cards and the AGP bus and to implement functions that cannot be done in host software for performance reasons.

Figure 3:
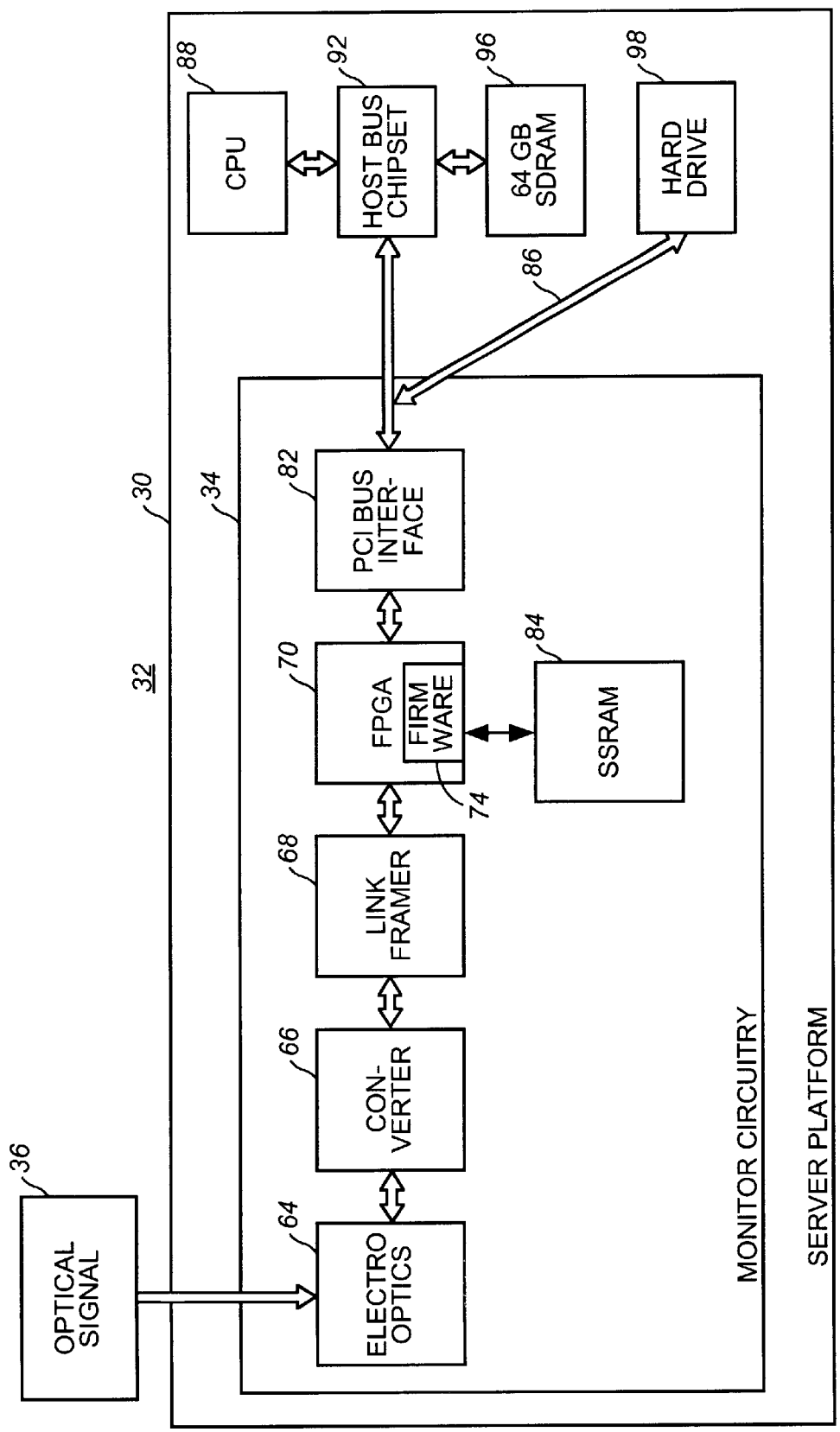
FIG. 3 shows a block diagram representation of an alternate embodiment of the traffic monitoring system of FIG. 2.

Referring now to FIG. 3, there is shown an alternate embodiment of monitor processor system 32 within multi protocol monitoring system 10. In the alternate embodiment shown in FIG. 3, the optical signals of optical link 36 is received by serial to parallel converter 66 previously described. However, in the alternate embodiment, serial to parallel converter 66 can be coupled to optional separate converter 66.

Optional separate converter 66 can include separate serial/parallel converters and multiplexer/demultiplexer devices for processing the received signals. Link framer 68 receives the output of optional separate converter 66. The framing of the information of the intercepted network link 46 permits distinguishing such signals as user data signals and link overhead signals. Gate array 70 is coupled to converter 66 and can operate substantially as previously described. Conventional PCI bus 86 provides an interface between server platform 30 and traffic monitoring circuitry 34.

Figure 4:
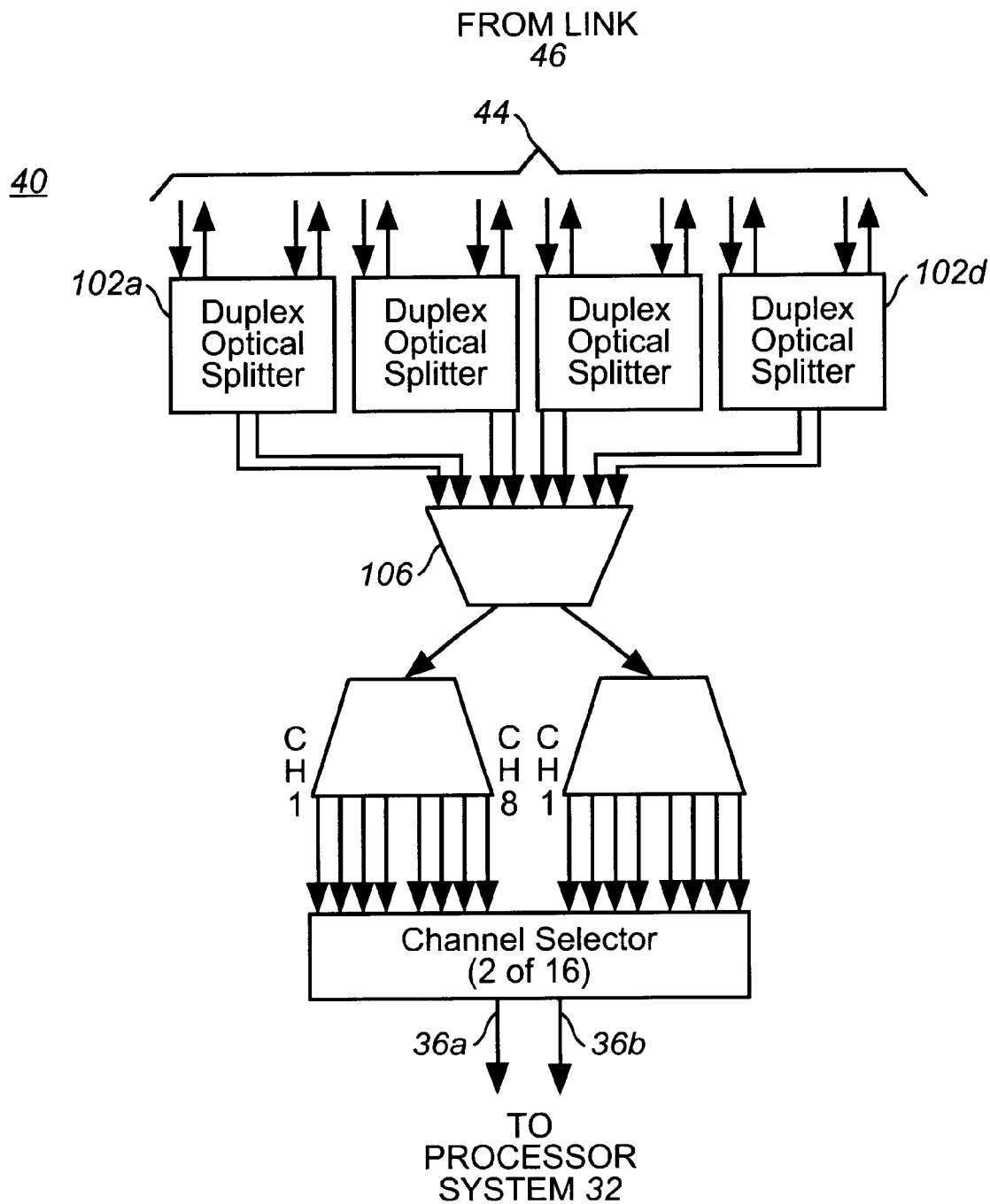
FIG. 4 shows a more detailed representation of the optical interceptor of the multi protocol optical link monitoring system of FIG. 1.

Referring now to FIG. 4, there is shown a more detailed representation of optical interceptor 40 of multi protocol monitoring system 10. Optical interceptor 40 receives optical signals from network link 46 by way of duplex optical links 44. The received optical signals are applied by optical links 44 to duplex optical splitters 102a–d.

Each optical splitter 102a–d comprises an individual optical link adapted to receive and transmit two optical wavelengths. Thus optical interceptor 40 is suitable for intercepting four optical links and a total of eight wavelengths from network link 46. Those skilled in the art will understand that the details of optical interceptor 40 are shown for illustrative purpose only and that optical interceptors having any link or wavelength capacity can be used to intercept light within multi protocol monitoring system 10.

Furthermore, it will be understood by those skilled in the art that any of the various buses of system 10 can be bidirectional in order to permit system 10 to transmit signals onto link 46 as well as intercept signals from link 46. Such dual transmit/receive operations can be performed simultaneously or one at a time, depending on the architecture of system 10. For example, trace and playback operations can be performed. When performing these operations it may also be preferred to pass link 46 through host 30 or to provide a splitter on each of the unidirectional paths of link 46 wherein each splitter can tap a signal and apply it to a individual server.

The signals provided by optical splitters 102a–d within optical interceptor 40 are applied to fiber selector 106. Fiber selector 106 selects one of the four links applied to it by optical splitters 102a–d. The selection of a link by fiber selector 106 can be performed under the control of terminal server 42 by way of control line 38 within multi protocol monitoring system 10. Terminal server 42 communicates with monitor processor system 32 by way of communication bus 28.

While control of optical interceptor 40 by terminal server 42 is shown for illustrative purposes, those skilled in the art will appreciate that any method of fiber selection or no fiber selection at all can be used within monitoring system 10. For example, control of fiber selection can be performed by server platform 30. However, it is believed that control of fiber selection by terminal server 42 is preferred over control by server platform 30 in order to apply the processing power of server platform 30 more fully to the operations of processing intercepted network information.

Although many different embodiments of the inventive concept are possible, certain embodiments are preferred. In describing the preferred embodiments, it is useful to perform a Use Case Analysis to elucidate system functions. This can then be followed by a set of Requirements that can be used to justify a design.

Use Case Analysis, also called Scenario analysis, is a technique common to many of the leading object oriented design methodologies. A Use Case Analysis documents the interaction between users and a system to discover the capabilities the system must have. The main use of the present system is to capture packets from sniffed links. Time stamps can be attached to the start of each packet, or for ATM mode to each cell. Also in ATM mode each ATM cell header can be copied to a host such as host 30. This enables ATM-level statistics in the host, such as how much non-IP traffic was sent by the VP's and enables host 30 to do a second-level reassembly if it has asked circuitry 34 to give it more than one cell per packet.

In one embodiment monitoring circuitry 34 only performs partial reassembly. Circuitry 34 copies all the cells for a packet to the host but the cells for a packet may not be contiguous in host memory. A linked list of cells for a packet can therefore be created by host application software after the cells have been copied to host memory as previously described.

This is done when the reassembly engine must keep the state of any VP-VC. There are 256 million possible VP-VC combinations for addressing in the VP part of the AMT channel (NNI addressing). The VP-VC bits can be selected as an address into the SSRAM 84 in which to hold the state of the VP-VC. Since the memory has fewer bytes than the total VP-VC address space, it is necessary to use only two bits of byte for each VC-VP state. Therefore each byte of SSRAM 84 stores the state of 4 VP-VC's. Using 2 bits means that only four states can be distinguished: first, second, third, or other, and last.

The host sees cells in the same order as they appeared on the link, possibly shuffled with the cells for the middle of a packet on other VC's. So the host also has to perform a secondary ATM reassembly to chain together the cells of a packet. This can be done using hashing to reduce the memory requirements or by direct indexing as on the card.

Monitor circuitry 34 can produce hashes for VPI/VCI state lookup under the assumption that all VC's does not have concurrently pending reassembly. This can release enough memory to allow circuitry 34 to hold a host memory address per reassembling VC. This will allow full reassembly which will place the cells of a packet in adjacent memory locations.

The previous description of the preferred embodiments is provided to enable a person skilled in the art to make and use the present invention. The various modifications to these embodiments will be readily apparent to those skilled in the art and the generic principles defined herein can be applied to other embodiments without the use of the inventive faculty. Thus, the present invention is not intended to be limited to the embodiments shown herein but is to be accorded the widest scope consistent with the principles and novel features disclosed.

What is claimed is:

1. A method for monitoring information traffic through a traffic link transmitting first and second differing information signals each having a plurality of information layers and first and second pluralities of information packets in a monitoring system having monitoring circuitry and including processor circuitry and a server operating cooperatively with said monitoring circuitry, said method comprising the steps of:

segmenting said information packets of said first and second pluralities of information packets into information cells to provide corresponding first and second pluralities of information cells;

interspersing said information cells of said first and second pluralities of information cells with each other to provide interspersed first and second information cells;

intercepting a portion of said interspersed first and second information cells to provide intercepted interspersed information cells using an interceptor coupled to said traffic link;

stripping an information layer from said intercepted interspersed information cells by said monitoring circuitry to provide a remaining information signal including portions of said intercepted interspersed information cells;

reassembling said intercepted interspersed information packets of at least one of said first and second pluralities of information packets within said remaining information signal to provide a plurality of reassembled information packets by said processor circuitry; and performing an analysis on said plurality of reassembled information packets by said server.

2. A method for monitoring information traffic through a traffic link transmitting first and second differing information signals each having a plurality of information layers and first and second pluralities of information packets in a monitoring system having monitoring circuitry and including processor circuitry and a server operating cooperatively with said monitoring circuitry, said method comprising the steps of:

segmenting said information packets of said first and second pluralities of information packets into information cells to provide corresponding first and second pluralities of information cells;

interspersing said information cells of said first and second pluralities of information cells with each other to provide interspersed first and second information cells;

intercepting a portion of said interspersed first and second information cells to provide intercepted interspersed information cells using an interceptor coupled to said traffic link;

stripping an information layer from said intercepted interspersed information cells by said monitoring circuitry to provide a remaining information signal including portions of said intercepted interspersed information cells;

reassembling said intercepted interspersed information packets of at least one of said first and second pluralities of information packets within said remaining information signal to provide a plurality of reassembled information packets by said processor circuitry;

performing an analysis on said plurality of reassembled information packets by said server; and coupling said monitoring circuitry to said server by means of an accelerated graphics port.

3. The method of claim 2, wherein said remaining information signal comprises a POS mode signal.

4. The method of claim 2, comprising the step of:

transmitting by way of said traffic link said plurality of reassembled information packets by said monitoring system.

5. The method of claim 2, wherein said information packets are provided with headers and the step of providing a plurality of reassembled information packets further comprises the step of reassembling in accordance with said headers.

6. The method of claim 5, wherein said information cells of said first and second pluralities of information cells have interspersed positions and the reassembly step comprises the step of selecting the cells of at least one of said first an second pluralities of information cells from their interspersed positions to provide a reassembled information signal.

7. The method of claim 2, wherein said monitoring circuitry comprises a reconfigurable processor for performing a plurality of differing applications corresponding to a plurality of differing configurations of said reconfigurable processor.

8. The method of claim 7, wherein said reconfigurable processor is reconfigured under the control of said server.

9. The method of claim 2, wherein said information layer stripped from said intercepted interspersed information cells comprises a network link layer.

10. The method of claim 9, wherein said network link layer comprises standards for transmitting said information signals on a network link.

11. The method of claim 10, wherein said network link layer comprises a representation of the percentage of the capacity of a network link that is used for overhead information.

12. The method of claim 2, comprising:

a selectable interceptor for selecting an information signal from a plurality of information signals transmitted through a corresponding plurality of traffic links to provide a selected information signal.

13. The method of claim 12, wherein the selecting of said selected information signal is controlled by a selected computer.

14. The method of claim 13, wherein said selecting computer comprises said server.

15. The method of claim 6, further comprising the step of: performing an analysis upon said reassembled information packet by said server.

16. The method of claim 15, wherein said analysis comprises a determination of the amount of information traffic transmitted through the traffic link.

17. The method of claim 15, wherein cells are lost during transmission of said each information signal and the analysis comprises a determination of the number of lost cells.

18. The method of claim 15, wherein said each information signal includes corrupted packets and the analysis comprises a determination of the number of corrupted packets.

19. The method of claim 18, comprising:

another traffic link, wherein the determination of the number of corrupted packets is made in accordance with packets in both said traffic link and said another traffic link.

20. The method of claim 15, wherein results of said analysis are applied to a reporting system.

21. The method of claim 20, wherein said reporting system applies the results of said analysis to the exterior of the monitoring system.

22. A system for monitoring information traffic through a traffic link transmitting first and second differing information signals each having a plurality of information layers and first and second pluralities of information packets in a monitoring system having monitoring circuitry and including processor circuitry and a server operating cooperatively with said monitoring circuitry, said system comprising:

corresponding first and second pluralities of information cells formed by segmenting said information packets of said first and second pluralities of information packets into information cells;

interspersed first and second information cells formed by interspersing said information cells of said first and second pluralities of information cells with each other;

an interceptor coupled to said traffic link for intercepting a portion of said interspersed first and second information cells to provide intercepted interspersed information cells;

a remaining information signal including portions of said intercepted interspersed information cells formed by stripping an information layer from said intercepted interspersed information cells by said monitoring circuitry;

a plurality of reassembled information packets formed by said processor circuitry according to said intercepted interspersed information packets of at least one of said first and second pluralities of information packets within said remaining information signal; and an analysis performed by said server on said plurality of reassembled information packets.

23. A system for monitoring information traffic through a traffic link transmitting first and second differing information signals each having a plurality of information layers and first and second pluralities of information packets in a monitoring system having monitoring circuitry and including processor circuitry and a server operating cooperatively with said monitoring circuitry, said system comprising corresponding first and second pluralities of information cells formed by segmenting said information packets of said first and second pluralities of information packets into information cells;

interspersed first and second information cells formed by interspersing said information cells of said first and second pluralities of information cells with each other;

an interceptor coupled to said traffic link for intercepting a portion of said interspersed first and second information cells to provide intercepted interspersed information cells;

a remaining information signal including portions of said intercepted interspersed information cells formed by stripping an information layer from said intercepted interspersed information cells by said monitoring circuitry;

a plurality of reassembled information packets formed by said processor circuitry according to said intercepted interspersed information packets of at least one of said first and second pluralities of information packets within said remaining information signal;

an analysis performed by said server on said plurality of reassembled information packets; and an accelerated graphics port for coupling said monitoring circuitry to said server.

24. The system of claim 23, wherein said remaining information signal comprises a POS mode signal.

25. The system of claim 23, wherein said information layer stripped from said intercepted interspersed information cells comprises a network link layer.

26. The system of claim 25, wherein said network link layer comprises a representation of the percentage of the capacity of a network link that is used for overhead information.

27. The system of claim 26, wherein said information cells of said first and second pluralities of information cells have interspersed positions and the cells of at least one of said first and second pluralities of information cells are selected from their interspersed positions to provide a reassembled information signal.

28. The system of claim 23, wherein said analysis comprises an analysis performed upon said reassembled information packet by said server.

29. The system of claim 28, wherein said analysis comprises a determination of the amount of information traffic transmitted through the traffic link.

30. The system of claim 29, wherein results of said analysis are applied to a reporting system.

31. The system of claim 30, wherein said reporting system applies the results of said analysis to the exterior of the monitoring system.

* * * * *